United States Patent
Takeda

(10) Patent No.: US 8,327,578 B1
(45) Date of Patent: Dec. 11, 2012

(54) PROCESS FOR THE OFF-SEASON PRODUCTION OF BLACKBERRIES

(75) Inventor: Fumiomi Takeda, Martinsburg, WV (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 268 days.

(21) Appl. No.: 12/887,851

(22) Filed: Sep. 22, 2010

(51) Int. Cl.
*A01G 17/06* (2006.01)

(52) U.S. Cl. .................................................. 47/58.1 FV

(58) Field of Classification Search .................. 47/4, 5.5, 47/7, 44–47, 58.1 R, 58.1 SE, 58.1 FV, 1.01 R, 47/1.01 P, 1.01 S
See application file for complete search history.

(56) References Cited

U.S. PATENT DOCUMENTS

| | | | | |
|---|---|---|---|---|
| 2,988,850 | A * | 6/1961 | Hechinger | 47/6 |
| 3,526,993 | A * | 9/1970 | Siebol | 47/46 |
| 3,585,756 | A * | 6/1971 | Johnson | 47/58.1 R |
| 4,333,266 | A * | 6/1982 | Babo | 47/58.1 R |
| 5,584,140 | A * | 12/1996 | Byrne | 47/58.1 R |
| 5,692,339 | A * | 12/1997 | Conley et al. | 47/58.1 R |
| 5,711,109 | A * | 1/1998 | Pitts | 47/58.1 R |
| 5,784,762 | A * | 7/1998 | Huntting | 24/129 R |
| 6,578,318 | B1 * | 6/2003 | Clark | 47/58.1 FV |
| 6,668,485 | B1 * | 12/2003 | Tivadar | 47/58.1 R |
| 7,818,915 | B1 * | 10/2010 | Flaishman | 47/58.1 FV |
| 2006/0150497 | A1 * | 7/2006 | Kaprielian | 47/62 R |
| 2009/0077877 | A1 * | 3/2009 | Kerber et al. | 47/29.5 |
| 2009/0277083 | A1 * | 11/2009 | Barnes | 47/46 |
| 2011/0030273 | A1 * | 2/2011 | Soupe | 47/58.1 R |
| 2011/0154731 | A1 * | 6/2011 | Schaeffer | 47/45 |

OTHER PUBLICATIONS

NPL1, Garden Guides, How to Propagate Raspberry Plants, Feb. 19, 2010.*
NPL2, eHow, How to Propagate Blackberry Plants, Oct. 9, 2009-Nov. 5, 2009.*
NPL3, The Garden Helper, How to grow and care for Raspberry Plants, May 8, 1999-Nov. 30, 2010.*
NPL4, Department of Horticulture, Bruce Bordelon, Raspberries, Dec. 2001.*
NPL5, Garden Action, Care of Blackberries, Jan. 15, 2010.*

* cited by examiner

*Primary Examiner* — Francis T Palo
*Assistant Examiner* — Joshua Huson
(74) *Attorney, Agent, or Firm* — John Fado; Robert D. Jones; Lesley Shaw

(57) ABSTRACT

Blackberries are grown so that an additional blackberry crop can be harvested after the normal blackberry growing season has ended. During the normal growing season a distal portion of a blackberry plant is rooted in a planting medium. After the conclusion of the growing season the distal portion is severed from the original plant so that the distal portion is independent form the original plant. After subjecting the distal portion to a chilling period, the distal portion is moved to a warmer climate (or simply warmed) and thereby produces a second harvest of blackberries in the off-season months of December to May.

15 Claims, 2 Drawing Sheets

PROCESS FOR THE OFF-SEASON PRODUCTION OF BLACKBERRIES

FIELD OF THE INVENTION

The present invention relates to a process for producing blackberries during an off-season time period for blackberries. Specifically, the invention relates to a method for producing blackberries during the December to May time period.

BACKGROUND OF THE INVENTION

Most blackberries are currently produced in Oregon, which accounted for a 2009 harvest of approximately 42.6 million pounds. Although blackberries are well-suited for production in the mid-Atlantic area, growers have been reluctant to plant blackberries because blackberries yield only one harvestable crop per year. This limitation renders blackberries less desirable than many competing crops which may produce multiple harvests or may continuously produce fruit throughout the growing season. After the blackberry harvest cycle has ended, the most prolific blackberry varieties must weather a period of cold temperatures (a "chilling period") before the vines will once again flower and produce berries.

The current invention describes a method whereby blackberries can be managed so that the vines produce berries earlier in the year, thereby extending the blackberry harvest and providing blackberries in the "off season" when market prices are high due to the relative scarcity of fresh blackberries.

SUMMARY OF THE INVENTION

The current invention is directed to a process for growing blackberries. In accordance with the current invention, a primary blackberry shoot is trained to grow horizontally so that the shoot comprises a primocane. At least one vertically extending secondary blackberry shoot emerges from the primocane and is trained onto a support structure. An end portion of the secondary shoot is buried in a planting medium so that the end portion of the secondary shoot develops into a new root system. After the roots have developed the secondary shoot is severed, thereby creating a distal portion of the secondary shoot (which includes the new root system) that is independent of the primocane. The distal portion is then subjected to a chilling period. After the chilling period the distal portion is warmed so that the distal portion produces blackberries during an off-season month (i.e. December to May).

DETAILED DESCRIPTION OF PREFERRED EMBODIMENTS

Figure 1:
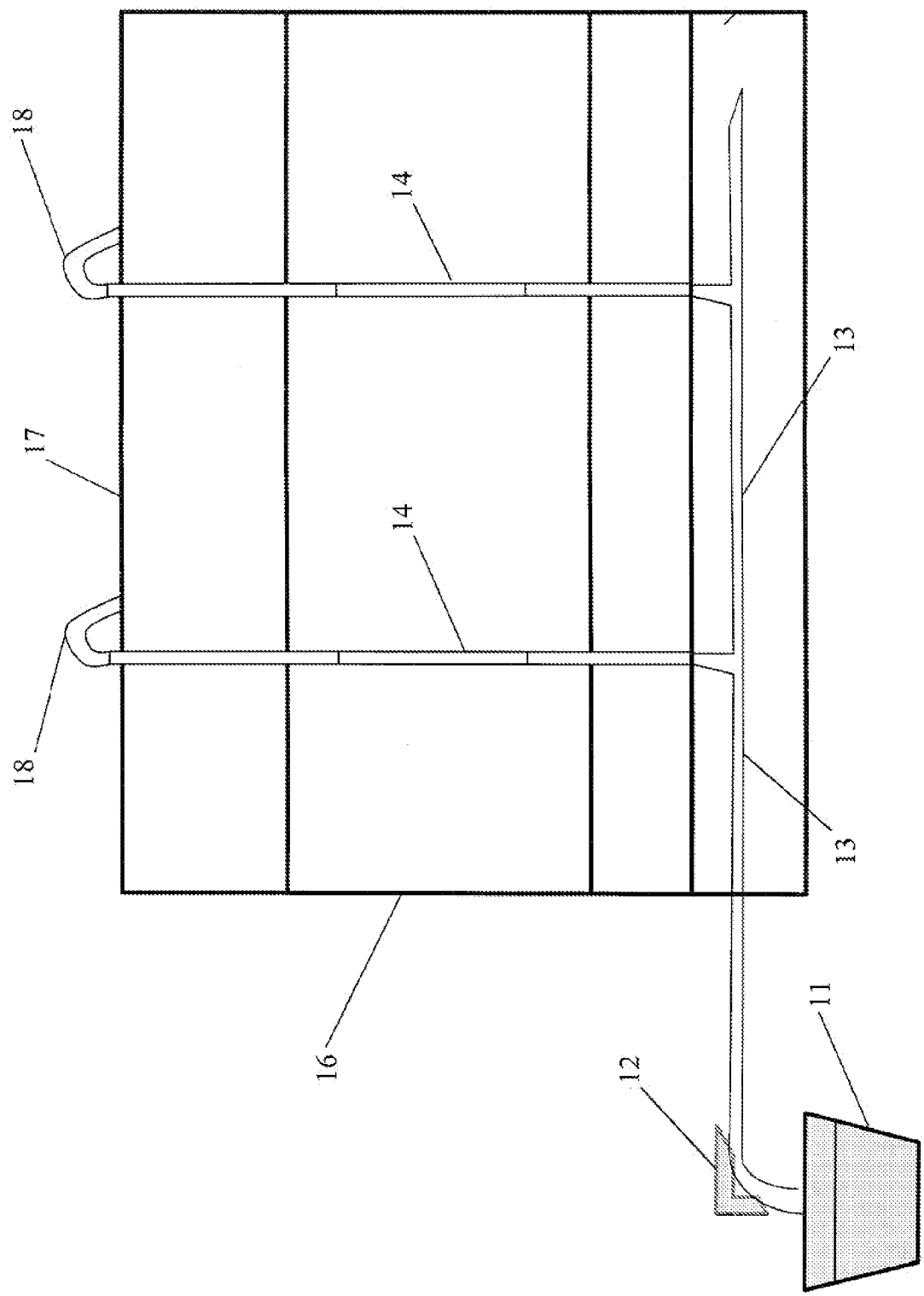
FIG. 1 is a schematic of the initial phases of blackberry cultivation in accordance with the current invention.
Figure 2:
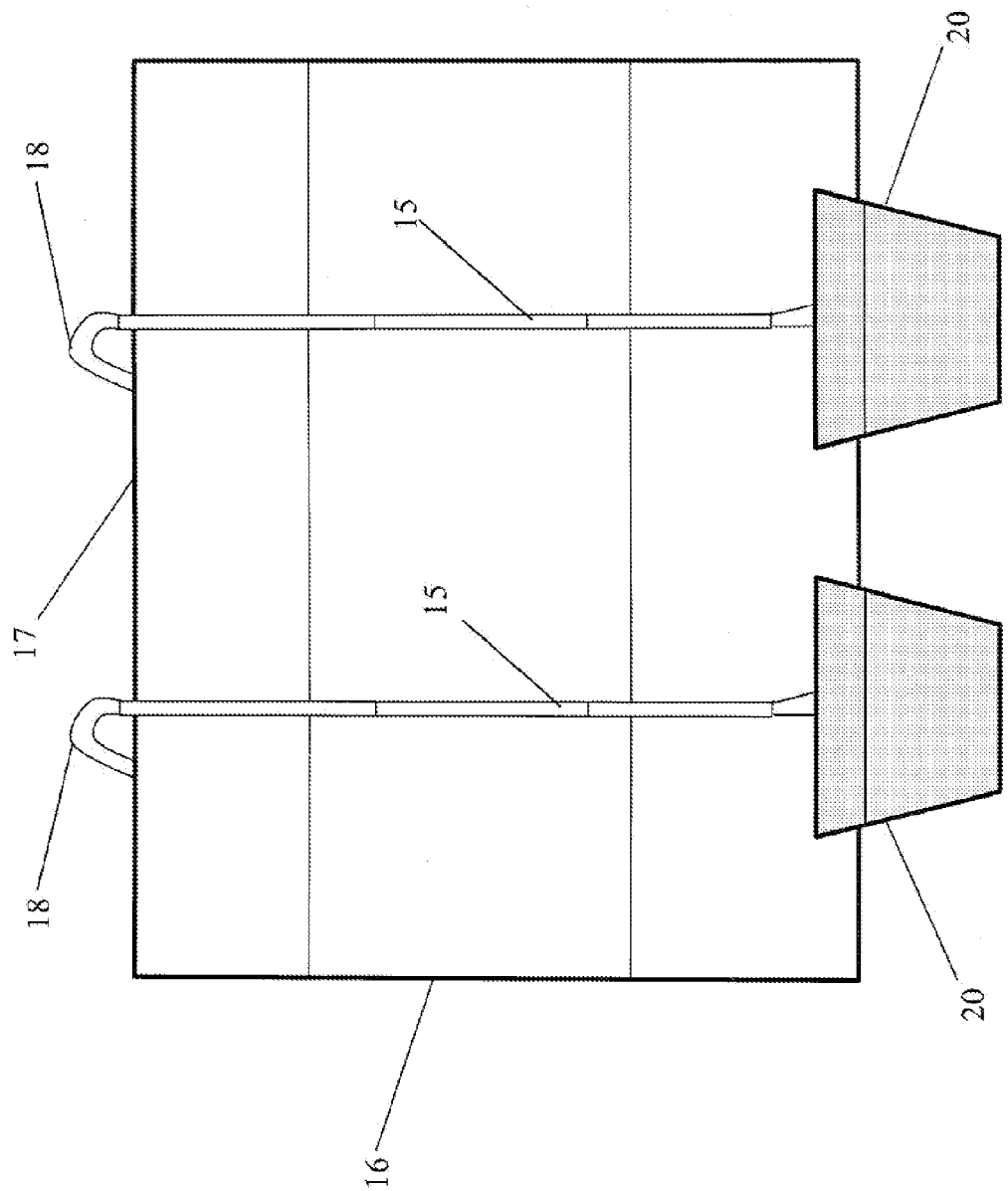
FIG. 2 is a schematic of the re-rooted berry vines.

As shown in FIG. 1, in accordance with the current invention, "Mother" or "stock" blackberry plants 10 are planted in geographical locations with a temperate climate (such as the mid-Atlantic region) which has relatively well-defined seasonal temperature variations. As vertical blackberry shoots (primary canes) emerge, they are directed to grow horizontally by an elbow-type training device 12 to form a horizontal primocane 13. As the primocanes 13 grow horizontally, they develop secondary shoots 14 that are trained to climb a support structure (such as a trellis) 16 so that elongated relatively vertical shoots 14 develop. These shoots 14 are proximal relative to the primocane 13. Eventually the proximal shoots 14 reach the top 17 of the trellis 16, where they are no longer supported by the trellis 16. This lack of support creates an apex and natural downward arc 18 at the top 17 of the trellis 16 so that the shoots 14 begin to grow down the opposite side of the trellis 16. As best shown in FIG. 2, the shoots growing down the opposite side of the trellis 16 are considered distal shoots 15 because their location is distal relative to the primocane 13.

Although FIG. 1 shows a blackberry plant 10 growing from an exemplary pot 11, the blackberries may also grow directly from the ground without the use of pots 11. Similarly, although FIG. 1 shows two secondary proximal shoots 14 as extending from the horizontal primocane 13, there may be more or less than two proximal shoots 14 emerging from the primocane 13. There may also be more than one plant 10 and associated primocane 13 emanating from a single pot 11. In the preferred embodiment, the trellis 16 is approximately 6 feet tall and comprises a rotating cross-arm trellis that allows machine harvesting of the berries. However, in alternative embodiments the trellis 16 may be taller or shorter than 6 feet and the trellis 16 may have any design known in the art.

FIG. 2 shows the opposite side of the FIG. 1 trellis 16. As shown in FIG. 2, the distal portion of each shoots 15 is trained back onto the trellis 16 and grows downwardly until it reaches the trellis 16 base. At the base of the trellis 16 an end portion of each distal shoot 15 is buried in a portable container (such as a conventional pot) 20 filled with a planting medium. In the preferred embodiment the planting medium comprises a non-soil medium. In alternative embodiments, a soil planting medium may be used or the end portion of the distal shoots 15 may be rooted directly in soil so that no pot is required.

The end portion of the distal shoots 15 generally requires a rooting period of about four weeks so that at the end of the four week rooting period the end portion of each distal shoot 15 has established a self-sustaining root system. At the end of the rooting period the original shoot 14, 15 is severed. In the preferred embodiment the shoot 14, 15 is severed at the shoot's apex 17. Severing the shoot 14, 15 separates the proximal portion 14 from the distal portion 15. The proximal portion 14 remains attached to the primocane 14, and a distal portion 15 (which includes the newly-established roots) is separated from the original primocane 13 and thereby becomes independent from the primocane 13.

In one embodiment, the severed end of the proximal shoot 14 is buried in a potting medium where it subsequently establishes roots. The newly-rooted proximal shoot 14 may then be severed from the primocane 13 and thereby also become an independent plant capable of producing fruit in an off-season month.

At the end of the normal growing season the newly rooted plants are allowed to remain in place in the temperate region until the plants are exposed to a "chilling period". As discussed supra, blackberry plants must weather a chilling period for auxiliary buds to emerge as flowering shoots. The chilling period comprises a minimum of approximately 650 hours (about 4 weeks) of temperatures of less than approximately 7 degrees C., preferably between 0 and 7 degrees C. Longer chilling periods should be considered within the scope of the invention.

After the chilling period, the plants are moved to a location with a warmer climate (such as south Florida) or to a greenhouse or other heated area. In warm conditions, the plants break buds within two weeks and a bloom occurs about 25 days after budding. Mature fruit can be harvested in about 35 to 42 days after bloom. In other words, fruit is produced in about 60 days after the termination of the chill period. In the preferred embodiment, the fruit is produced during normal blackberry off-season months. For the purpose of this disclosure, "off season months" are defined as December through May. Fruit produced during the off-season is considered "out of season" and fetches a premium price.

For the foregoing reasons, it is clear that the invention provides an innovative process for producing blackberries in off-season months. The current invention may be modified and customized as required by a specific operation or application, and the individual components may be modified and defined, as required, to achieve the desired result. Although some of the materials of construction are not described, they may include a variety of compositions consistent with their described function. Such variations are not to be regarded as a departure from the spirit and scope of the invention, and all such modifications as would be obvious to one skilled in the art are intended to be included within the scope of the following claims.

What is claimed is:

1. A process for growing blackberries comprising:
a vertical support structure,
training a blackberry shoot to extend horizontally adjacent to said vertical support structure and thereby developing a horizontally extending primocane;
allowing at least one vertically extending secondary proximal blackberry shoot to emerge from the primocane;
training the secondary shoot to grow vertically on, up and over said support structure;
burying an end portion of the secondary shoot in a planting medium so that the end portion develops into a new root system;
severing the secondary shoot and thereby creating proximal and distal portions of the secondary shoot, the proximal portion remaining attached to the primocane and the distal portion comprising the new root system and being independent of the proximal portion and the primocane;
subjecting the distal portion to a chilling period; and
warming the distal portion so that the distal portion produces blackberries in an off-season month.

2. The process of claim 1 wherein, in the allowing step, multiple secondary blackberry shoots emerge from the primocane.

3. The process of claim 1 wherein, in the training step, the support structure comprises a trellis.

4. The process of claim 3 wherein the trellis comprises a rotating cross-arm trellis.

5. The process of claim 3 wherein, in the training step, the secondary shoots are trained to grow up the trellis to an apex of vertical growth and then down the trellis to a trellis base.

6. The process of claim 5 wherein, in the severing step, the secondary shoot is severed at said apex of the shoot.

7. The process of claim 3 wherein, in the training step, the secondary shoots grow up one side of the trellis and down an opposite side.

8. The process of claim 3 wherein the trellis is about six feet tall.

9. The process of claim 1 wherein in the burying step, the end portion is buried in a portable container.

10. The process of claim 9 wherein the portable container is positioned proximate a base of the support structure.

11. The process of claim 1 wherein in the severing step, the secondary shoot is severed approximately half way between the new root system and the primocane.

12. The process of claim 1 wherein the severing step further comprises:
burying a severed end of the proximal portion and thereby rooting the end of the proximal portion,
severing the proximal portion from the primocane so that the proximal portion comprises an independent plant;
subjecting the proximal portion to a chilling period; and
warming the proximal portion so that the proximal portion produces blackberries in an off season month.

13. The process of claim 1 wherein in the subjecting step, the chilling period comprises approximately 4 weeks or 650 hours at a temperature of less than 7° C.

14. The process of claim 1 wherein in the warming step, the distal portion is geographically relocated to an area with a warmer climate.

15. The process of claim 1 wherein in the warming step, blackberries are produced within 60 days of termination of the chilling period.

* * * * *